(12) United States Patent
Wang et al.

(10) Patent No.: US 12,554,088 B2
(45) Date of Patent: Feb. 17, 2026

(54) FIBER-OPTIC TERMINAL BOX

(71) Applicant: ANYCOM TECHNOLOGY CO., LTD, Guangdong (CN)

(72) Inventors: Huapin Wang, Guangdong (CN); Bingli Liu, Guangdong (CN); Jie Wang, Guangdong (CN); Zhengwu Yang, Guangdong (CN)

(73) Assignee: ANYCOM TECHNOLOGY CO., LTD, Shenzhen (CN)

( * ) Notice: Subject to any disclaimer, the term of this patent is extended or adjusted under 35 U.S.C. 154(b) by 197 days.

(21) Appl. No.: 18/389,229

(22) Filed: Nov. 14, 2023

(65) Prior Publication Data

US 2024/0418958 A1 Dec. 19, 2024

Related U.S. Application Data

(63) Continuation of application No. PCT/CN2023/107556, filed on Jul. 14, 2023.

(30) Foreign Application Priority Data

Jun. 19, 2023 (CN) .......................... 202310732250.3
Jun. 19, 2023 (CN) .......................... 202321574755.3

(51) Int. Cl.
*G02B 6/00* (2006.01)
*G02B 6/44* (2006.01)

(52) U.S. Cl.
CPC ............................ *G02B 6/44775* (2023.05)

(58) Field of Classification Search
CPC .............. G02B 6/44775; G02B 6/3825; G02B 6/3897; G02B 6/44465; G02B 6/00
See application file for complete search history.

(56) References Cited

U.S. PATENT DOCUMENTS

| | | | | |
|---|---|---|---|---|
| 7,146,090 | B2 * | 12/2006 | Vo .......................... | G02B 6/387 |
| | | | | 385/139 |
| 8,472,777 | B2 * | 6/2013 | Cui ...................... | G02B 6/3897 |
| | | | | 385/139 |
| 2018/0348447 | A1 * | 12/2018 | Nhep ................... | G02B 6/3847 |

* cited by examiner

*Primary Examiner* — Jennifer Doan

(57) ABSTRACT

The present invention discloses a fiber-optic terminal box, which includes a housing and a connecting assembly, wherein the housing is provided with a plurality of connecting holes and insertion channels, the connecting assembly is detachably connected to the housing by means of the connecting holes, and the insertion channels are configured for a third-party fiber-optic connecting device to be inserted for connection to the fiber-optic terminal box. The connecting assembly includes a knob, a connecting component and a reset component, wherein a connecting portion having a preset length is axially provided on a peripheral side of the knob, a fitting portion fitting with the connecting portion is provided on a peripheral side of the connecting component, the reset component is sleeved on an outer side wall of the knob and moves synchronously with the knob, and the connecting hole is provided with a slot fitting with the reset component.

10 Claims, 4 Drawing Sheets

FIBER-OPTIC TERMINAL BOX

CROSS-REFERENCE TO RELATED APPLICATIONS

The present application is a Continuation Application of PCT Application No. PCT/CN2023/107556, filed on Jul. 14, 2023, which claims the priorities of Chinese Patent Application No. 2023107322503 and No. 2023215747553, both filed on Jun. 19, 2023, the entire contents of which are hereby incorporated by reference.

TECHNICAL FIELD

The present disclosure relates to the technical field of physical connections for fiber-optic communication, and more particularly to a fiber-optic terminal box.

DESCRIPTION OF THE PRIOR ART

In a fiber-to-the-home scenario, a fiber-optic terminal box is generally used to connect the fiber-optic connector and a fiber-optic adapter.

Currently, there have been two technical methods for the fiber-optic terminal box. According to one technical method, a button with a through hole is provided on a fiber-optic terminal box, and a protrusion is provided in the button, and a fiber-optic connector is passed through the through hole and then snap-fitted to the protrusion of the button; when the button is pressed, the protrusion leaves the fiber-optic connector downwardly, and in this case, the fiber-optic connector may be taken out; when the button is not pressed, the protrusion abuts against the fiber-optic connector to achieve tensile resistance. However, the fiber-optic terminal box using this connection method has a poor tensile effect, and the problem of loosening is prone to occur in an outdoor environment, thus affecting the connection accuracy and connection stability of the fiber-optic connector. According to the other technical method, a locking structure for securing a fiber-optic terminal box and a fiber-optic connector is provided on the fiber-optic connector, thereby improving the tensile effect of the fiber-optic connector inserted into the fiber-optic terminal box. However, this technical method requires a larger space to connect the fiber-optic connector and the fiber-optic terminal box, and may also increase the size and weight of the fiber-optic terminal box, which leads to higher requirements for a mounting environment, the problem of unstable mounting is likely to occur, and thus affecting the connection accuracy and connection stability of the fiber-optic connector.

Therefore, how to improve the tensile and securing effects of the fiber-optic connector inserted into the fiber-optic terminal box while improving the convenience of connection and ensuring the connection stability and connection accuracy of the fiber-optic connector becomes a technical problem urgently needing to be solved.

SUMMARY OF THE DISCLOSURE

The present invention provides a fiber-optic terminal box in order to improve a securing effect on a fiber-optic connector inserted into the fiber-optic terminal box, so as to ensure the connection stability and connection accuracy of the fiber-optic connector.

The present invention provides a fiber-optic terminal box, including a housing and a connecting assembly.

The housing is provided with a plurality of connecting holes and insertion channels communicating with the connecting holes in a one-to-one correspondence manner, wherein the axis of each insertion channel intersects and is coplanar with the axis of the corresponding connecting hole, and the planes where the axes intersect with each other are parallel to each other; the connecting assembly is detachably connected to the housing by means of the connecting holes, and the insertion channels are configured for a third-party fiber-optic connecting device to be inserted for connection to the fiber-optic terminal box.

The connecting assembly includes a knob, a connecting component and a reset component, wherein
 a peripheral side of the knob is provided with a connecting portion having a preset length in an axial direction;
 a peripheral side of the connecting component is provided with a fitting portion that fits with the connecting portion;
 the reset component is sleeved on an outer side wall of the knob and moves synchronously with the knob, and the connecting hole is provided with a slot fitting with the reset component;
 when the knob is rotated, the connecting component moves axially within a connecting stroke of the connecting portion on the basis of the fitting between the fitting portion and the connecting portion, so as to abut against the third-party fiber-optic connecting device, and the reset component rotates from a first position to a second position and fits with the slot to limit a circumferential movement of the knob, such that the third-party fiber-optic connecting device can be firmly connected to the fiber-optic terminal box.

The present invention discloses a fiber-optic terminal box which includes the housing and the connecting assembly; the housing is provided with the plurality of connecting holes and the insertion channels communicating with the connecting holes in a one-to-one correspondence manner, wherein the axis of the insertion channel intersects with the axis of the corresponding connecting hole; the connecting assembly includes the knob, the connecting component and the reset component; the connecting portion having the preset length is provided on the peripheral side of the knob in the axial direction; the fitting portion fitting with the connecting portion is provided on the peripheral side of the connecting component, the reset component is sleeved on the outer side wall of the knob and moves synchronously with the knob, and the connecting hole is provided with the slot fitting with the reset component. When the knob is rotated, on the basis of a fitting relationship between the fitting portion and the connecting portion, the connecting portion moves axially along the connecting component within the stroke of the connecting portion under the drive of the knob. When the connecting component moves in place, the connecting component can abut against the third-party fiber-optic connecting device mounted in the insertion channel, thereby exerting a pressure on the third-party fiber-optic connecting device in the axial direction of the connecting component; meanwhile, the reset component also rotates from the first position to the second position during the rotation of the knob, and fits with the slot in the connecting hole in the second position, thereby limiting the knob circumferentially and preventing the knob from being reset. By means of the pressure of the connecting component on the third-party fiber-optic connecting device, the third-party fiber-optic connecting device is secured in the fiber-optic terminal box, thereby improving the tensile and securing effects of the third-party fiber-optic connecting device in the fiber-optic terminal box, and ensuring the connection stability and connection accuracy of the fiber-optic connector. Moreover, since the third-party fiber-optic connecting device can be limited and secured only by rotating the knob, the convenience of connection is also improved.

BRIEF DESCRIPTION OF DRAWINGS

In order to illustrate the technical solutions in embodiments of the present invention more clearly, a brief introduction to the drawings required for describing the embodiments will be provided below. Obviously, the drawings in the following description are merely some of the embodiments of the present invention, and those of ordinary skill in the art would also obtain other drawings according to these drawings without involving any inventive effort.

DETAILED DESCRIPTION OF EMBODIMENTS

The present invention is described below based on embodiments, but the present invention is not limited to these embodiments. In the following detailed description of the present invention, some specific details are depicted in order to avoid obscuring the essence of the present invention. Common general methods, processes, and components are not set forth in detail.

In addition, those of ordinary skill in the art will appreciate that the drawings provided herein are for illustrative purposes and are not necessarily drawn to scale.

Unless the context clearly indicates otherwise, the words such as "comprise(s)", "include(s)", etc. throughout the description and the claims shall be construed as having an inclusive meaning rather than an exclusive or exhaustive meaning, that is to say, a meaning of "including, but not limited to".

In the description of the present invention, it is to be understood that the terms "first", "second", etc. are merely for descriptive purposes and shall not be construed as indicating or implying relative importance. In addition, in the description of the present invention, unless otherwise specified, the term "a plurality of" means two or more.

Figure 1:
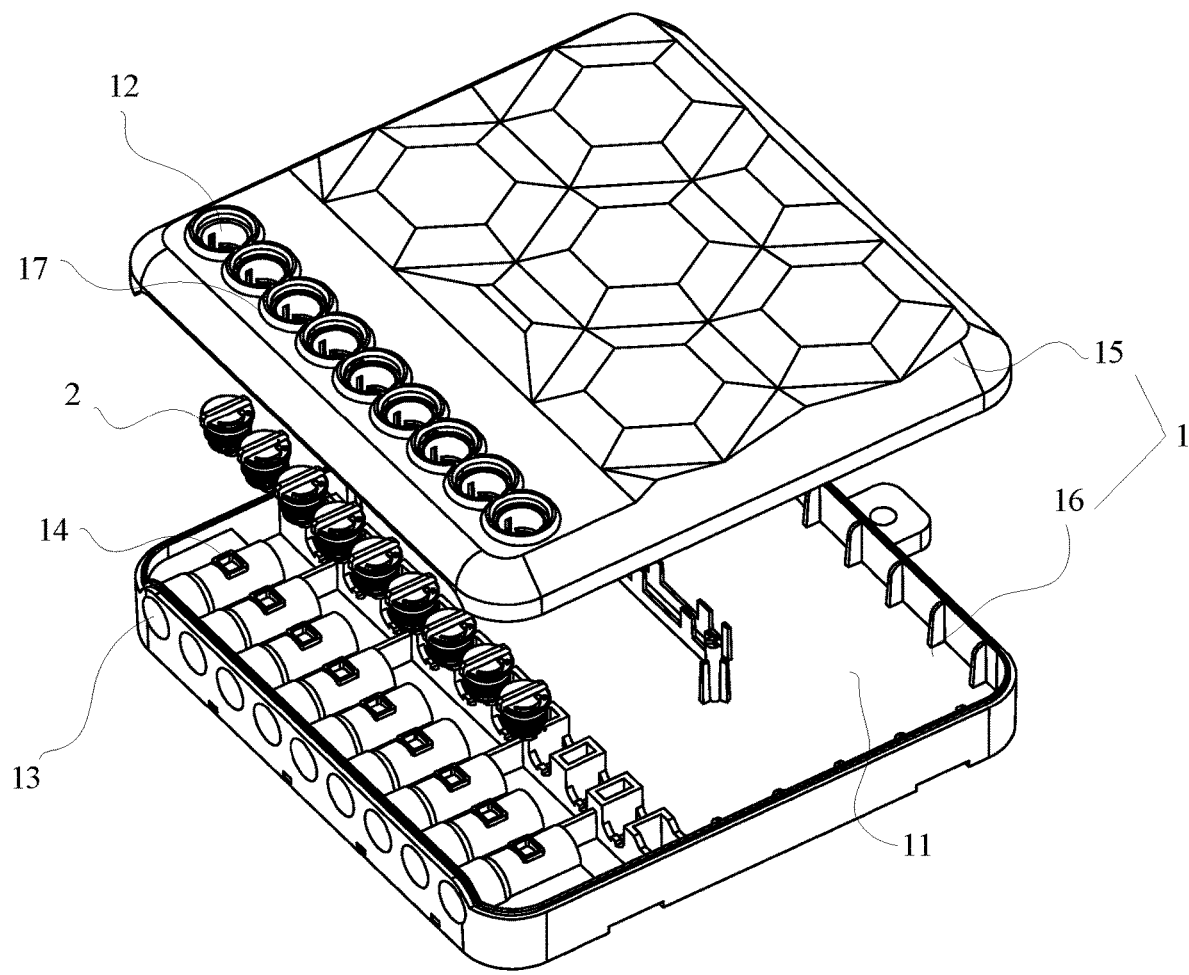
FIG. 1 is a schematic view showing an exploded structure of a fiber-optic terminal box according to an embodiment of the present invention.

Referring to FIG. 1, FIG. 1 is a schematic view showing an exploded structure of a fiber-optic terminal box according to an embodiment of the present invention. The fiber-optic terminal box includes a housing 1 and a connecting assembly 2, wherein the connecting assembly 2 is detachably connected to the housing 1, and a third-party fiber-optic connecting device connected to the fiber-optic terminal box may be secured by means of the connecting assembly 2, so as to improve the securing effect on the third-party fiber-optic connecting device in the fiber-optic terminal box, and thus ensure connection stability and connection accuracy.

The housing 1 is provided with a plurality of connecting holes 12 and insertion channels 13 communicating with the connecting holes 12 in a one-to-one correspondence manner, wherein the axis of each insertion channel 13 intersects and is coplanar with the axis of the corresponding connecting hole 12, and the planes where the axes intersect are parallel to each other; the connecting assembly 2 is detachably connected to the housing 1 by means of the connecting holes 12, and the insertion channels 13 are configured for the third-party fiber-optic connecting device to be inserted for connection to the fiber-optic terminal box.

The housing 1 is provided with a plurality of connecting holes 12 and a plurality of insertion channels 13, each insertion channel 13 corresponds to a connecting hole 12, the axis of the insertion channel 13 intersects and is coplanar with the axis of the connecting hole 12 corresponding to the insertion channel 13, and the planes where the axes of the insertion channels 13 intersect with the axes of the connecting holes 12 corresponding to the insertion channels 13 are parallel to each other. That is to say, the plurality of connecting holes 12 are provided in parallel, and the plurality of insertion channels 13 are also provided in parallel. The intersection of the axis of the insertion channel 13 and the axis of the corresponding connecting hole 12 means that the insertion channel 13 and the corresponding connecting hole 12 can intersect with each other after spaced by a certain distance, rather than being provided in parallel. Preferably, the insertion channel 13 may be provided perpendicular to the corresponding connecting hole 12.

The connecting hole 12 communicates with the corresponding insertion channel 13, such that the connecting assembly 2 can at least partially enter the insertion channel 13 to secure the third-party fiber-optic connecting device mounted in the insertion channel 13.

Figure 2:
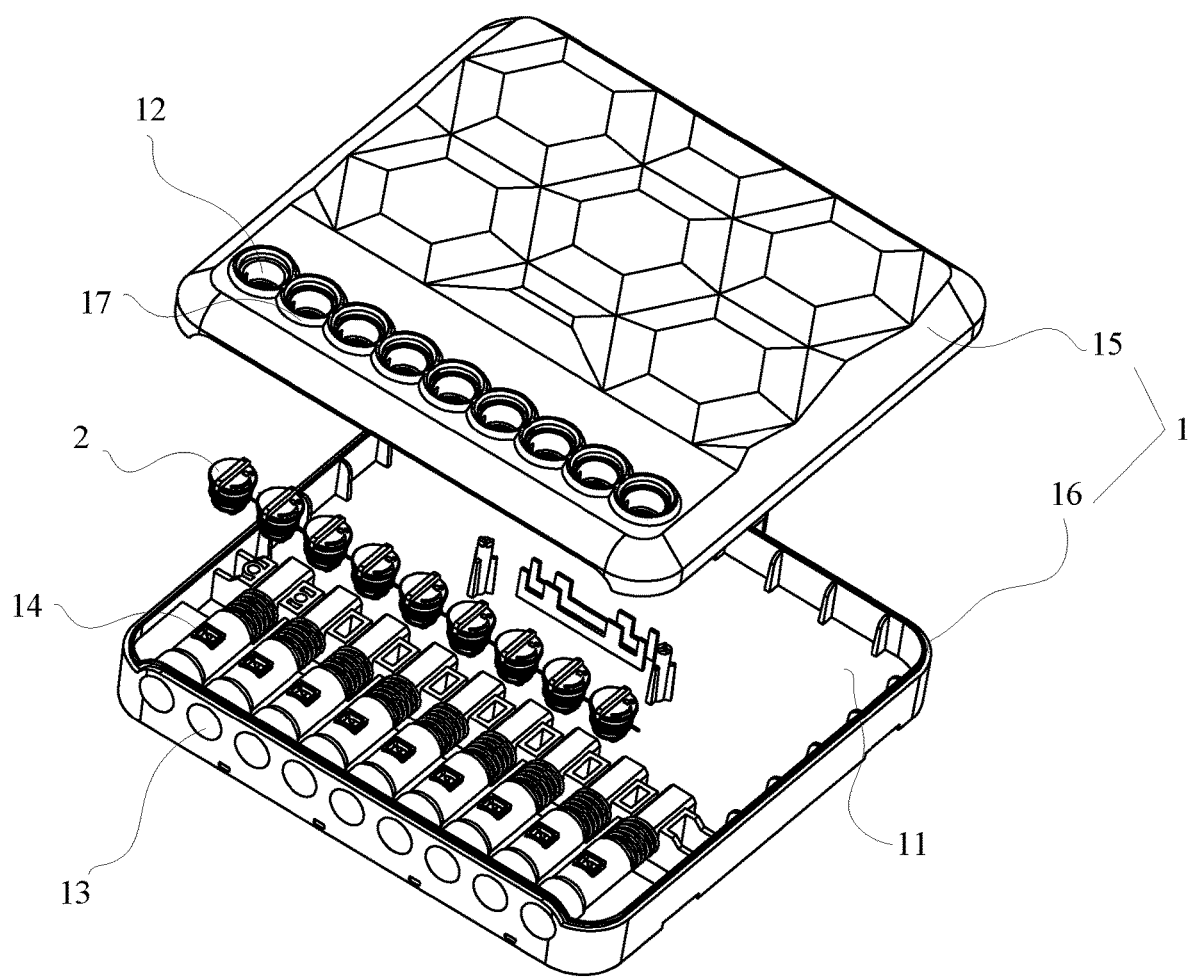
FIG. 2 is a schematic structural view of a connecting assembly according to an embodiment of the present invention.

In some embodiments, a cavity 11 is provided inside the housing 1, and the cavity 11 is configured to accommodate a fiber-optic cable and/or an internal adapter. As shown in FIG. 2, it is a schematic structural diagram showing that an internal adapter is provided in the fiber-optic terminal box. The internal adapter communicates with and is firmly connected to one end of the insertion channel 13, and the internal adapter is mounted in the fiber-optic terminal box, such that the third-party fiber-optic connecting device may be directly connected to the internal adapter after entering the fiber-optic terminal box through the insertion channel 13, achieving fiber-optic connection. Also, in this embodiment, both the connecting hole 12 and the insertion channel 13 communicate with the cavity 11 directly or indirectly.

Figure 3:
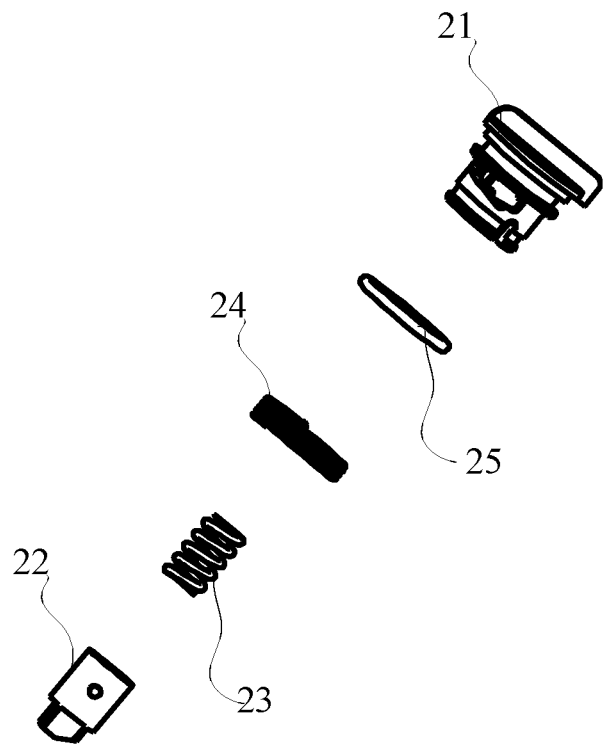
FIG. 3 is a schematic view showing an exploded structure of the connecting assembly according to an embodiment of the present invention.
Figure 4:
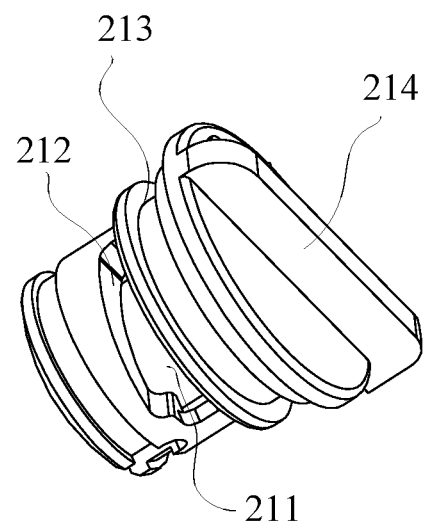
FIG. 4 is a schematic structural view of a knob in the connecting assembly according to an embodiment of the present invention.
Figure 5:
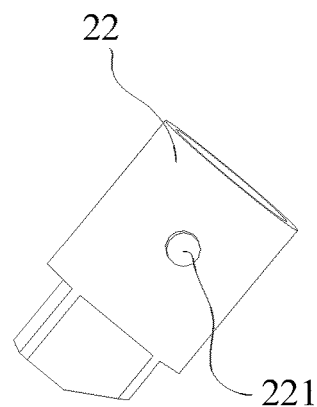
FIG. 5 is a schematic structural view of a connecting component in the connecting assembly according to an embodiment of the present invention.

Referring to FIG. 3, FIG. 3 is a schematic view showing an exploded structure of a connecting assembly according to an embodiment of the present invention. FIG. 4 is a schematic structural view of a knob in the connecting assembly according to an embodiment of the present invention. FIG. 5 is a schematic structural view of a connecting component in the connecting assembly according to an embodiment of the present invention.

As shown in FIGS. 3, 4 and 5, the connecting assembly 2 includes a knob 21, a connecting component 22 and a reset component 24.

A peripheral side of the knob 21 is provided with a connecting portion 212 having a preset length in an axial direction. A peripheral side of the connecting component 22 is provided with a fitting portion 221 that fits with the connecting portion 212. The reset component 24 is sleeved on an outer side wall of the knob 21 and moves synchronously with the knob 21, and the connecting hole 12 is provided with a slot fitting with the reset component 24.

During a specific implementation, the connecting portion 212 may be a groove, and the fitting portion 221 is a protrusion fitting with the groove; the connecting portion 212 may also be a protrusion, and the fitting portion 221 is a groove fitting with the protrusion. Synchronous movement of the reset component 24 and the knob 21 means that when the knob 21 is rotated, the knob 21 drive the reset component 24 to rotate in the same direction.

During the specific implementation, the reset component 24 may be a torsion spring. A side wall of the connecting hole 12 is provided with a slot (not shown) in an axial direction, and in the process of rotating the knob 21, the slot is fitting with the reset component 24, such that after firm connection, the knob 21 and the connecting component 22 are secured, preventing the knob 21 and the connecting component 22 from loosening. After the reset component 24 is provided, when it is required to disassemble the connecting assembly 2 from the housing 1, an operator needs to actively apply a relatively large force to the knob 21, so as to improve the securing effect on the fiber-optic connector inserted into the fiber-optic terminal box, and thus ensure the connection stability and connection accuracy of the fiber-optic connector.

When the knob 21 is turned, the connecting component 22 moves axially within a connecting stroke of the connecting portion 212 on the basis of the fitting between the fitting portion 221 and the connecting portion 212, so as to abut against the third-party fiber-optic connecting device, and the reset component 24 rotates from a first position to a second position and fits with the slot to limit circumferential movements of the knob 21 and the connecting component 22, such that the third-party fiber-optic connecting device can be firmly connected to the fiber-optic terminal box.

When the knob 21 is rotated, on the basis of the fitting between the fitting portion 221 and the connecting portion 212, the connecting component 22 is moved axially within the stroke of the connecting portion 212 under the drive of the knob 21. Since the connecting portion 212 is provided on the peripheral side of the knob 21 in the axial direction, during the movement of the connecting component 22, the movement is the axial movement along the connecting component 22, which also makes it possible for the connecting component 22 to abut against the third-party fiber-optic connecting device mounted in the insertion channel 13 after the connecting component 22 moves in place, thereby exerting a pressure on the third-party fiber-optic connecting device in the axial direction of the connecting component 22, that is, in the circumferential direction of the third-party fiber-optic connecting device.

Also, the reset component 24 rotates from the first position to the second position during the rotation of the knob 21, and fits with the slot on the connecting hole 12 in the second position, thereby limiting the circumferential direction of the knob 21, and preventing the knob 21 from being reset. In this case, the third-party fiber-optic connecting device is subjected to the pressure from the connecting component 22, and the third-party fiber-optic connecting device is secured in the fiber-optic terminal box, thereby improving the tensile and securing effects of the third-party fiber-optic connecting device in the fiber-optic terminal box, and ensuring the connection stability and connection accuracy of the fiber-optic connector. Since the third-party fiber-optic connecting device can be limited and secured only by rotating the knob 21, the convenience of connection is also improved. Moreover, in this present invention, a locking structure (that is, the connecting assembly 2), for securing the fiber-optic terminal box and the third-party fiber-optic connecting device is provided on the fiber-optic connector, so that when the third-party fiber-optic connecting device is connected to the fiber-optic terminal box, the plug and play of the third-party fiber-optic connecting device may be implemented, the space occupied by the third-party fiber-optic connecting device and the fiber-optic terminal box during firm connection is decreased, the fiber-optic terminal box can be used in a narrow and small space or environment, and thus high-density and high-integration wiring can be completed.

In an embodiment, as shown in FIG. 4, the connecting portion 212 on the knob 21 is provided outside the knob 21 in a circumferential direction of the knob 21, and extends by a predetermined length in an axial direction of the knob 21. In other words, the connecting portion 212 is an arc-shaped structure in the circumferential direction of the knob 21, rather than a horizontal structure or a vertical structure provided in the circumferential direction of the knob 21.

As shown in FIG. 4, a cavity 211 is provided in the knob 21 in the axial direction, one end of the cavity 211 communicates with the outside, and the connecting portion 212 communicates with the cavity 211. The connecting component 22 is partly located in the cavity 211, and the fitting portion 221 is provided on the peripheral side of the connecting component 22.

During the specific implementation, the outer diameter of the connecting component 22 is less than the inner diameter of the cavity 211, so that when the fitting portion 221 fits with the connecting portion 212, the connecting component 22 can be partially provided inside the cavity 211 of the knob 21, and the end of the connecting component 22 located outside the cavity 211 of the knob 21 is used for abutting against the third-party fiber-optic connecting device mounted in the insertion channel 13, thereby securing the third-party fiber-optic connecting device in the fiber-optic terminal box and improving the tensile and securing effects of the third-party fiber-optic connecting device in the fiber-optic terminal box.

As shown in FIG. 3, the connecting assembly 2 further includes an elastic component 23, wherein the elastic component 23 is located in the cavity 211, one end of the elastic component 23 abuts against an inner wall of the cavity 211, and the other end of the elastic component 23 abuts against the connecting component 22.

During the specific implementation, the elastic component 23 is provided in the cavity 211, and when the connecting assembly 2 is in an initial state (i.e., an unscrewed state), the elastic component 23 is in an unfolded state. When the connecting assembly 2 is in a connected state (i.e., a screwed state), the knob 21 drives the connecting component 22 to move axially to a certain extent while the knob 21 is rotated. During the axial movement of the connecting component 22, the elastic component 23 is continuously stressed; on the one hand, a buffering effect is played to prevent the connecting component 22 from directly bumping against the third-party fiber-optic connecting device, thereby ensuring the firmness and durability of connection; on the other hand, when the third-party fiber-optic connecting device is secured, there may be a certain space for adjustment, so that the position and connection firmness of the third-party fiber-optic connecting device can be better adjusted.

As shown in FIG. 5, the end of the connecting component 22 located outside the cavity 211 has a trapezoidal cross section in the axial direction, and the third-party fiber-optic connecting device is provided with a groove (not shown) fitting with the connecting component 22.

During the specific implementation, the end of the connecting component 22 located outside the cavity 211 of the knob 21 has the trapezoidal cross section, and the third-party fiber-optic connecting device is provided with the groove fitting with the trapezoid in shape, so that after the connecting component 22 abuts against the third-party fiber-optic connecting device mounted in the insertion channel 13, the securing effect on the fiber-optic connector inserted into the fiber-optic terminal box can be improved, and thus the connection stability and connection accuracy of the fiber-optic connector can be ensured.

It can be understood that the groove provided in the third-party fiber-optic connecting device has a slope that can fit with the side of the trapezoidal structure on the connecting component 22, and the bottom in the groove that can fit with the base of the trapezoidal structure on the connecting component 22. It is not necessarily required that the groove can completely fit with the trapezoidal structure on the connecting component 22.

Figure 6:
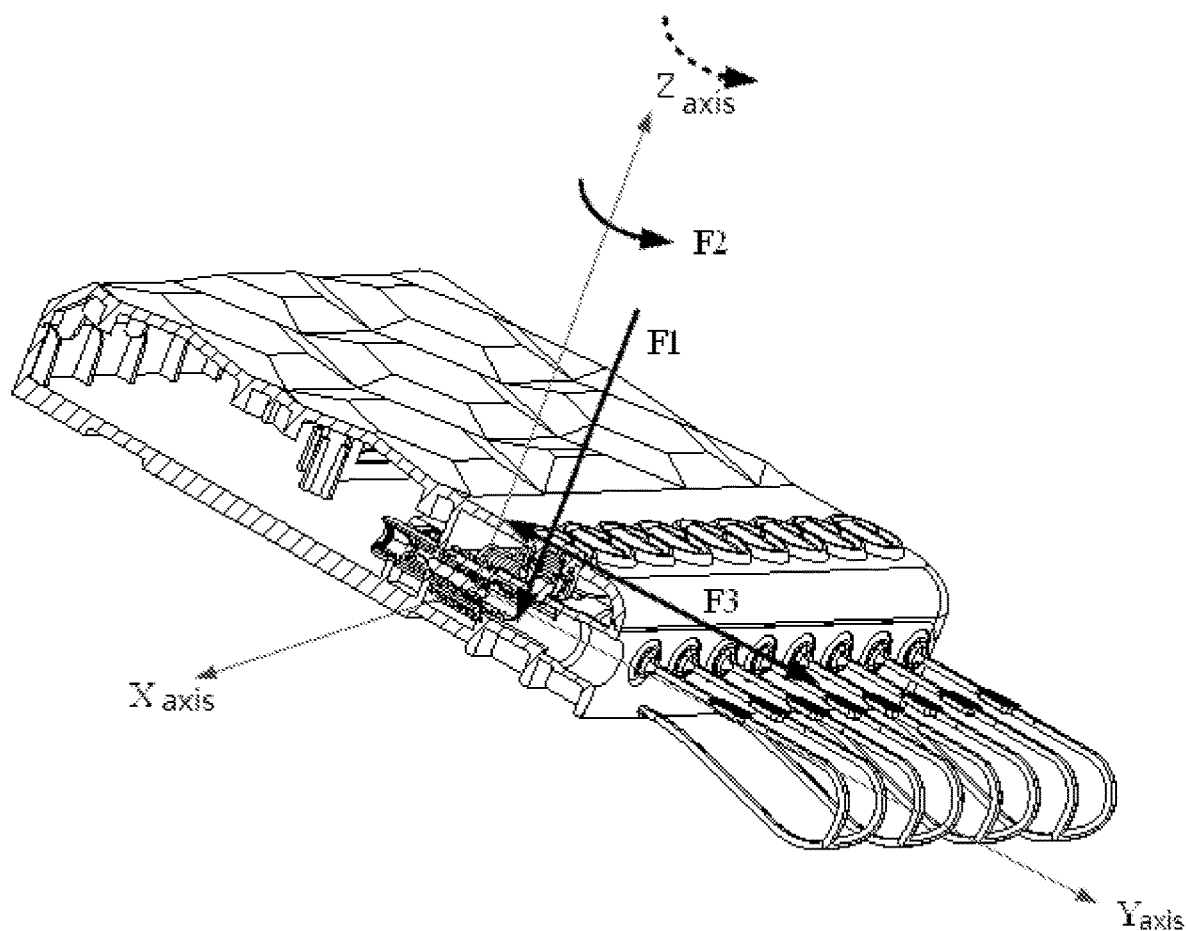
FIG. 6 is a schematic stress view of a third-party fiber-optic connecting device inserted into the fiber-optic terminal box according to an embodiment of the present invention.

As shown in FIG. 6, FIG. 6 is a schematic stress view of the third-party fiber-optic connecting device inserted into the fiber-optic terminal box according to an embodiment of the present invention.

When it is required to secure the third-party fiber-optic connecting device in the fiber-optic terminal box, in the process of rotating the knob 21 (the direction of rotation is shown by the dotted arrow), the connecting component 22 continuously moves toward the Z axis under the drive of the knob 21, thereby continuously exerting a certain pressure F1 on the Z axis of the third-party fiber-optic connecting device until the fitting portion 221 moves to the tail end of the stroke of the connecting portion 212, and in this case, the connecting component 22 abuts against the third-party fiber-optic connecting device. During this process, the reset component 24 also continue to rotate during the rotation of the knob 21 until it rotates from the first position to the second position and fits with the slot in the connecting hole 12, and in this case, the reset component 24 exert a force F2 around the Z axis in the same direction as the rotation direction of the knob 21, so as to prevent the knob 21 from being reset due to no force. In addition, since the third-party fiber-optic connecting device is provided with a groove that fits with the connecting component 22, after the connecting component 22 abuts against the third-party fiber-optic connecting device, the connecting component 22 fitting with the groove generates a resistance F3 when the third-party fiber-optic connecting device moves in its axial direction, limiting the movement of the third-party fiber-optic connecting device along the Y axis. Furthermore, the insertion channel 13 also restricts the movement of the third-party fiber-optic connecting device along the X axis.

The third-party fiber-optic connecting device is limited and secured in the three directions of X axis, Y axis and Z axis, thereby improving the securing effect on the fiber-optic connector inserted into the fiber-optic terminal box, and ensuring the connection stability and connection accuracy of the fiber-optic connector. Also, the operator can implement the limiting in the three directions only by rotating the knob 21, greatly improving the convenience of securely connecting the third-party fiber-optic connecting device in the fiber-optic terminal box.

When it is required to remove the third-party fiber-optic connecting device from the fiber-optic terminal box, the operator can exert a force opposite to the rotation direction on the knob 21. Due to the slot in the connecting hole 12, the operator needs to apply a larger force to automatically reset the reset component 24 from the second position to the first position after the reset component leaves the slot, and in this case, the knob 21 and the connecting component 22 may be removed directly, thereby dismounting the third-party fiber-optic connecting device from the fiber-optic terminal box.

In an embodiment, as shown in FIG. 1, an insertion hole 14 is provided inside the housing 1. The insertion hole 14 is coaxial with the connecting hole 12 and communicates the connecting hole 12 with the insertion channel 13. The size of the insertion hole 14 is not less than the size of the end of the connecting component 22 located outside the cavity 211.

That is to say, the size of the insertion hole 14 should not be less than the size of the trapezoidal structure on the connecting component 22, as long as the trapezoidal structure on the connecting component 22 can pass through the insertion hole. On this premise, the insertion hole 14 may be a round hole or a square hole, and is preferably a square hole. Since the insertion hole 14 is provided inside the housing 1, when the third-party fiber-optic connecting device is secured, the connecting component 22 needs to pass through the insertion hole 14 to abut against the third-party fiber-optic connecting device, which is equivalent to limiting the connecting component 22 and the connecting portion of the third-party fiber-optic connecting device again, so that the rotation, fall or other situations are less likely to occur between the connecting component 22 and the third-party fiber-optic connecting device that are connected, the securing effect on the fiber-optic connector inserted into the fiber-optic terminal box is further improved, and thus the connection stability and connection accuracy of the fiber-optic connector are ensured.

In an embodiment, as shown in FIG. 3, the connecting assembly 2 further includes a sealing ring 25, wherein a sealing ring groove 213 is provided in the outer side wall of the knob 21, and the sealing ring 25 is provided in the sealing ring groove 213. A sealing ring 15 is provided on the knob 21, such that after the connecting assembly 2 is firmly connected to the housing 1, the possibility of impurities such as rainwater and dust entering the housing 1 from a connection gap between the connecting assembly 2 and the housing 1 is greatly reduced, the sealing effect on the fiber-optic terminal box is improved, and the connection accuracy of the optical fiber in the fiber-optic terminal box is thus ensured.

In an embodiment, the diameter of the end of the knob 21 located outside the fiber-optic terminal box is greater than the diameter of the connecting hole 12. An operating portion 214 is provided on an end surface of the end of the knob 21 located outside the fiber-optic terminal box.

After the connecting assembly 2 and the housing 1 is firmly connected, the knob 21 is partially located outside the fiber-optic terminal box, and the diameter of the end located outside the fiber-optic terminal box is greater than the diameter of the connecting hole 12, so that after the connecting assembly 2 and the housing 1 are firmly connected, a certain closing effect is played on the connecting hole 12, and reducing the possibility of impurities such as rainwater and dust entering the housing 1 from the connection gap between the connecting assembly 2 and the housing 1; in combination with the use of the sealing ring 25, the fiber-optic terminal box can be better sealed to ensure the connection accuracy of the optical fiber in the fiber-optic terminal box.

The operating portion 214 provided on the end surface of the end of the knob 21 outside the fiber-optic terminal box bring convenience to the operator to rotate the knob 21 during mounting or dismounting, improving the convenience of operation. It can be understood that the operating portion 214 can be structurally a protruding rib or a groove. When the operating portion 214 is a groove, the operator can rotate the knob 21 with a tool.

In an embodiment, as shown in FIG. 1, a convex ring 17 is provided on the outer side of the housing 1 around the peripheral side of the connecting hole 13, and the height of the convex ring 17 is greater than or equal to the height of the protruding rib 214.

The convex ring 17 is provided on the outer side of the connecting hole 13, and the height of the convex ring 17 is greater than or equal to the height of the protruding rib 214, which reduces the possibility of touching the knob 21 and the protruding rib 214 on the knob 21 for non-artificial reasons, avoiding to a great extent the situation that the knob 21 is loosened accidentally due to a non-artificial external force, ensuring the securing effect on the fiber-optic connector inserted into the fiber-optic terminal box, and thus ensuring the connection stability and connection accuracy of the fiber-optic connector.

In an embodiment, as shown in FIG. 1, an outer surface of the housing 1 has an uneven structure that can play a buffering effect, so that when the fiber-optic terminal box is compressed and bumped during use, the fiber-optic connector inserted into the fiber-optic terminal box is not directly affected, and the impact on connection stability and connection accuracy is reduced.

In an embodiment, a hanging hole may further be provided in the housing 1. The hanging hole can be provided in the back of the housing 1, that is, a side opposite to the connecting hole 13, or may be provided in a side surface of the housing 1. The hanging hole may be directly provided in the housing 1, or a part may be mounted on the housing 1, which is not limited herein. The housing 1 can be secured in a place by means of the hanging hole, for example, on a wall, in an electrical box, and etc.

In an embodiment, as shown in FIG. 1, the housing 1 includes an upper housing 15 and a lower housing 16, wherein the connecting hole 12 is provided in the upper housing 15, and the insertion holes 14 and the insertion channels 13 are provided in the lower housing 16; when the upper housing 15 and the lower housing 16 are firmly connected together, a cavity 11 is formed between the upper housing 15 and the lower housing 16.

During the specific implementation, the connecting hole 12 is provided in the upper housing 15 and runs through the upper housing 15. It can be understood that the housing 1 may also be configured as an integrated structure, or the upper housing 15 and the lower housing 16 may be distinguished using other partition methods.

In an embodiment, the fiber-optic terminal box may further include a sealing plug. A plurality of connecting holes 12 and insertion channels 13 can be provided in the fiber-optic terminal box. When there is no third-party fiber-optic connecting device is connected in the insertion channels 13, the insertion channels 13 may be sealed with the sealing plugs to prevent impurities such as dust and rainwater from entering the fiber-optic terminal box and affecting the connection accuracy of optical fibers.

The fiber-optic terminal box disclosed in the embodiment includes the housing and the connecting assembly; the housing is provided with a plurality of connecting holes and insertion channels communicating with the connecting holes in the one-to-one correspondence manner, wherein the axis of the insertion channel intersects with the axis of the corresponding connecting hole; the connecting assembly includes the knob, the connecting component and the reset component; the connecting portion having a preset length is provided on the peripheral side of the knob in the axial direction; the fitting portion fitting with the connecting portion is provided on the peripheral side of the connecting component, the reset component is sleeved on the outer side wall of the knob and moves synchronously with the knob, and the connecting hole is provided with a slot fitting with the reset component. When the knob is rotated, on the basis of a matching relationship between the fitting portion and the connecting portion, the connecting portion moves axially along the connecting component within the stroke of the connecting portion under the drive of the knob. When the connecting component moves in place, the connecting component can abut against the third-party fiber-optic connecting device mounted in the insertion channel, thereby exerting a pressure on the third-party fiber-optic connecting device in the axial direction of the connecting component; meanwhile, the reset component also rotates from the first position to the second position during the rotation of the knob, and fits with the slot in the connecting hole at the second position, thereby limiting the knob circumferentially and preventing the knob from being reset. By means of the pressure of the connecting component on the third-party fiber-optic connecting device, the third-party fiber-optic connecting device is secured in the fiber-optic terminal box, thereby improving the tensile and securing effects of the third-party fiber-optic connecting device in the fiber-optic terminal box, and ensuring the connection stability and connection accuracy of the fiber-optic connector. Moreover, since the third-party fiber-optic connecting device can be limited and secured only by rotating the knob, the convenience of connection is also improved.

The above foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A fiber-optic terminal box, comprising: a housing, and a connecting member, wherein
   the housing is provided with a plurality of connecting holes and insertion channels communicating with the connecting holes in a one-to-one correspondence manner, where the axis of each insertion channel intersects and is coplanar with the axis of the corresponding connecting hole, and the planes where the axes intersect with each other are parallel to each other; the connecting assembly is detachably connected to the housing by means of the connecting holes, and the insertion channels are configured for a third-party fiber-optic connecting device to be inserted for connection to the fiber-optic terminal box;
   the connecting assembly comprises a knob, a connecting component and a reset component, where
   a peripheral side of the knob is provided with a connecting portion having a preset length in an axial direction;
   a peripheral side of the connecting component is provided with a fitting portion that fits with the connecting portion;

the reset component is sleeved on an outer side wall of the knob and moves synchronously with the knob, and the connecting hole is provided with a slot that fits with the reset component;

when the knob is turned, the connecting component moves axially within a connecting stroke of the connecting portion on the basis of the fitting between the fitting portion and the connecting portion, so as to abut against the third-party fiber-optic connecting device, and the reset component rotates from a first position to a second position and fits with the slot to limit the circumferential movement of the knob, such that the third-party fiber-optic connecting device can be firmly connected to the fiber-optic terminal box.

2. The fiber-optic terminal box of claim 1, wherein the connecting portion is provided outside the knob in the circumferential direction of the knob, and extends by a predetermined length in the axial direction of the knob.

3. The fiber-optic terminal box of claim 1, wherein a cavity is provided in the knob in the axial direction, one end of the cavity communicates with the outside, and the connecting portion communicates with the cavity; and the connecting component is partly located in the cavity, and the fitting portion is provided on the peripheral side of the connecting component.

4. The fiber-optic terminal box of claim 2, wherein the connecting assembly further comprises an elastic component, where the elastic component is located in the cavity, one end of the elastic component abuts against an inner wall of the cavity, and the other end of the elastic component abuts against the connecting component.

5. The fiber-optic terminal box of claim 1, wherein the end of the connecting component located outside the cavity has a trapezoidal cross section in the axial direction, and the third-party fiber-optic connecting device is provided with a groove fitting with the connecting component.

6. The fiber-optic terminal box of claim 5, wherein an insertion hole is provided inside the housing, the insertion hole is coaxial with the connecting hole and communicates the connecting hole with the insertion channel, and the size of the insertion hole is not less than the size of the end of the connecting component located outside the cavity.

7. The fiber-optic terminal box of claim 1, wherein the connecting assembly further comprises a sealing ring, where a sealing ring groove is provided in the outer side wall of the knob, and the sealing ring is provided in the sealing ring groove.

8. The fiber-optic terminal box of claim 1, wherein the diameter of the end of the knob located outside the fiber-optic terminal box is greater than the diameter of the connecting hole.

9. The fiber-optic terminal box of claim 1, wherein an operating portion is provided on an end surface of the end of the knob located outside the fiber-optic terminal box.

10. The fiber-optic terminal box of claim 1, wherein the housing comprises an upper housing and a lower housing, where the connecting hole is provided in the upper housing, and the insertion hole and the insertion channel are provided in the lower housing; and when the upper housing and the lower housing are firmly connected, a cavity is formed between the upper housing and the lower housing.

* * * * *